US006789388B1

(12) United States Patent
Leigh-Monstevens et al.

(10) Patent No.: US 6,789,388 B1
(45) Date of Patent: Sep. 14, 2004

(54) TRIPLE ACTION DAMPER FOR HYDRAULIC CLUTCH ACTUATOR

(75) Inventors: Keith V. Leigh-Monstevens, Rochester Hills, MI (US); Arlan E. Vennefron, Adrian, MI (US)

(73) Assignee: Automotive Products (USA), Inc., Auburn Hills, MI (US)

( * ) Notice: Subject to any disclaimer, the term of this patent is extended or adjusted under 35 U.S.C. 154(b) by 329 days.

(21) Appl. No.: 10/004,917

(22) Filed: Dec. 4, 2001

Related U.S. Application Data

(63) Continuation-in-part of application No. 09/620,436, filed on Jul. 20, 2000, now Pat. No. 6,430,928.

(51) Int. Cl.$^7$ .................................................. F16B 7/00
(52) U.S. Cl. .......................................... 60/533; 60/592
(58) Field of Search .......................... 60/592, 533, 469

(56) References Cited

U.S. PATENT DOCUMENTS

| | | | |
|---|---|---|---|
| 3,090,201 A | 5/1963 | May | |
| 4,166,655 A | 9/1979 | Spero | |
| 4,188,073 A | 2/1980 | Ishikawa et al. | |
| 4,301,908 A | 11/1981 | Fukuda et al. | |
| 4,315,527 A | 2/1982 | Donnenberg et al. | ......... 138/30 |
| 4,427,029 A | 1/1984 | Charney et al. | |
| 4,599,860 A | 7/1986 | Parsons | |
| 4,629,562 A | 12/1986 | Kercher | |
| 4,779,625 A | 10/1988 | Cole | |
| 4,911,276 A | 3/1990 | Leigh-Monstevens et al. | |
| 4,924,992 A | 5/1990 | Romig | |
| 4,986,404 A | 1/1991 | Kajitani et al. | |
| 4,998,609 A | 3/1991 | Nix et al. | |
| 5,020,864 A | 6/1991 | Tanaka | |
| 5,031,969 A | 7/1991 | Siegel | |
| 5,058,961 A | 10/1991 | Mergenthaler et al. | |
| 5,070,983 A | 12/1991 | Leigh-Monstevens et al. | |
| 5,320,203 A | 6/1994 | Wilber et al. | |
| 5,368,073 A * | 11/1994 | Murphy | ......................... 138/30 |
| 5,410,945 A | 5/1995 | Schops et al. | .................. 92/48 |
| 5,806,705 A * | 9/1998 | Herald et al. | ................ 220/350 |
| 6,148,614 A | 11/2000 | Nix et al. | |
| 6,401,966 B2 * | 6/2002 | Tsai | ........................... 220/723 |

FOREIGN PATENT DOCUMENTS

| | | |
|---|---|---|
| DE | 2 208 491 | 2/1972 |
| DE | 3733189 A1 | 4/1989 |

(List continued on next page.)

*Primary Examiner*—Edward K. Look
*Assistant Examiner*—Igor Kershteyn
(74) *Attorney, Agent, or Firm*—Young & Basile, P.C.

(57) ABSTRACT

A clutch hydraulic actuator system having a vibration damper provided in the system between a master cylinder and a slave cylinder of the system. The damper includes a housing, an elastomeric diaphragm, and a spring steel diaphragm. The upper face of the elastomeric diaphragm is in fluid communication with hydraulic fluid in the system so that the elastomeric diaphragm may deflect in response to low frequency vibrations transmitted through hydraulic fluid in the system to effect damping of the low frequency vibrations. The spring steel diaphragm is positioned in the system generally parallel to and proximate the lower face of the elastomeric diaphragm so as to form a back up for the elastomeric diaphragm so that the elastomeric diaphragm may deform against the spring steel diaphragm in response to intermediate frequency vibrations transmitted through the hydraulic fluid to cause deflection of the spring steel diaphragm to effect damping of the intermediate frequency vibrations. A thin annular sidewall of the damper housing coacts with the upper face of the elastomeric diaphragm to form a large volume fluid chamber above the elastomeric diaphragm which provides further, high frequency system damping by virtue of vibratory volumetric expansion of the thin housing sidewall.

12 Claims, 3 Drawing Sheets

FOREIGN PATENT DOCUMENTS

| | | | |
|---|---|---|---|
| DE | 3807954 A1 | 9/1989 | |
| EP | 197911 A * | 10/1986 | ............ B25D/9/12 |
| EP | 0 491 159 A1 | 11/1991 | |
| FR | 2 451 536 | 10/1980 | |
| FR | 2 596 171 | 9/1987 | |
| FR | 2 611 023 | 8/1988 | |
| FR | 2 655 128 | 11/1989 | |
| GB | 996 841 | 6/1965 | |
| GB | 1 089 667 | 11/1967 | |
| GB | 1 350 530 | 4/1974 | ............ F15B/1/04 |
| GB | 1 562 709 | 3/1980 | |
| GB | 2 058 272 A | 4/1981 | |
| GB | 2 139 702 A | 11/1984 | |
| GB | 2 266 341 A | 5/1992 | |
| GB | 2 348 259 A | 9/2000 | |
| JP | 54 3731 | 12/1979 | |
| JP | 55 72421 | 5/1980 | |
| JP | 59 50232 | 3/1984 | |
| JP | 59 89833 | 5/1984 | |
| JP | 59 89834 | 5/1984 | |

* cited by examiner

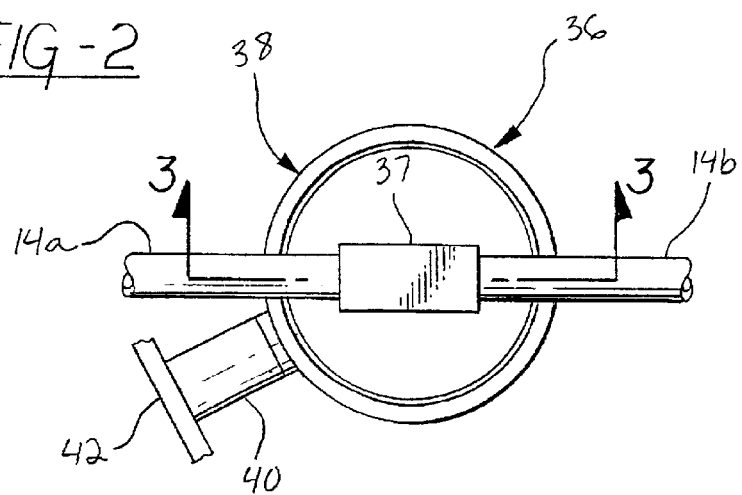
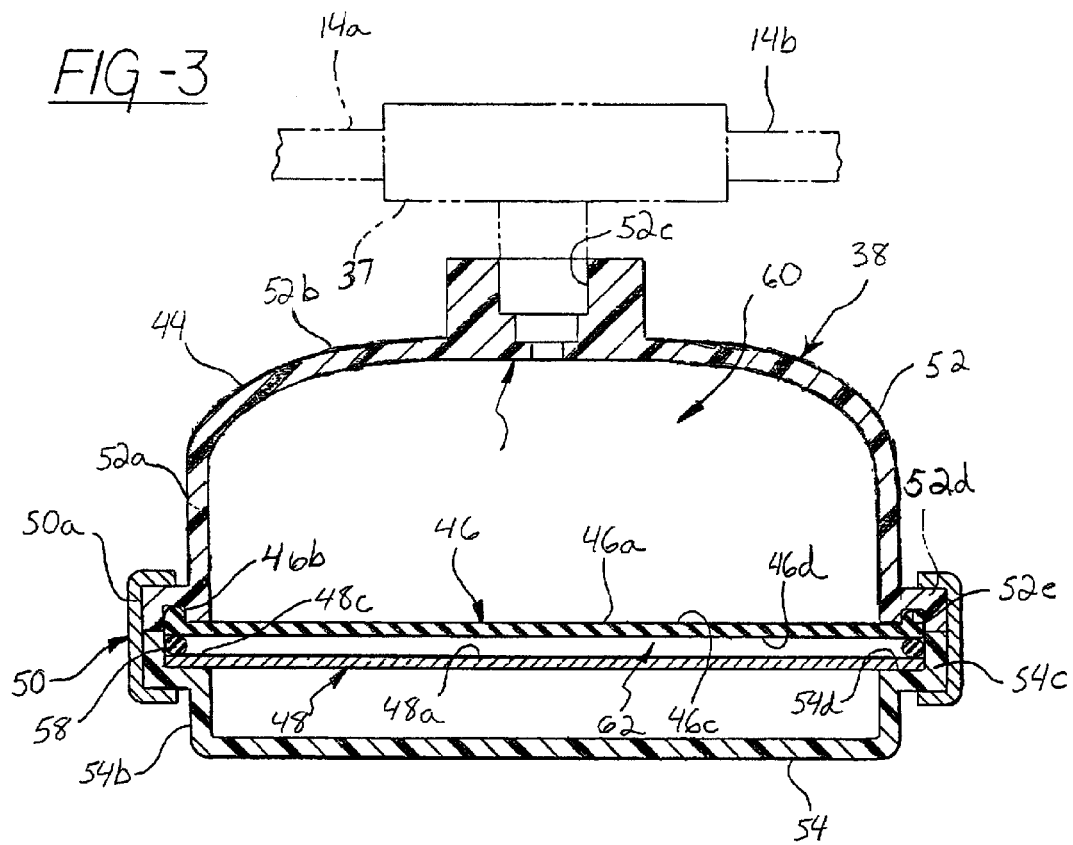

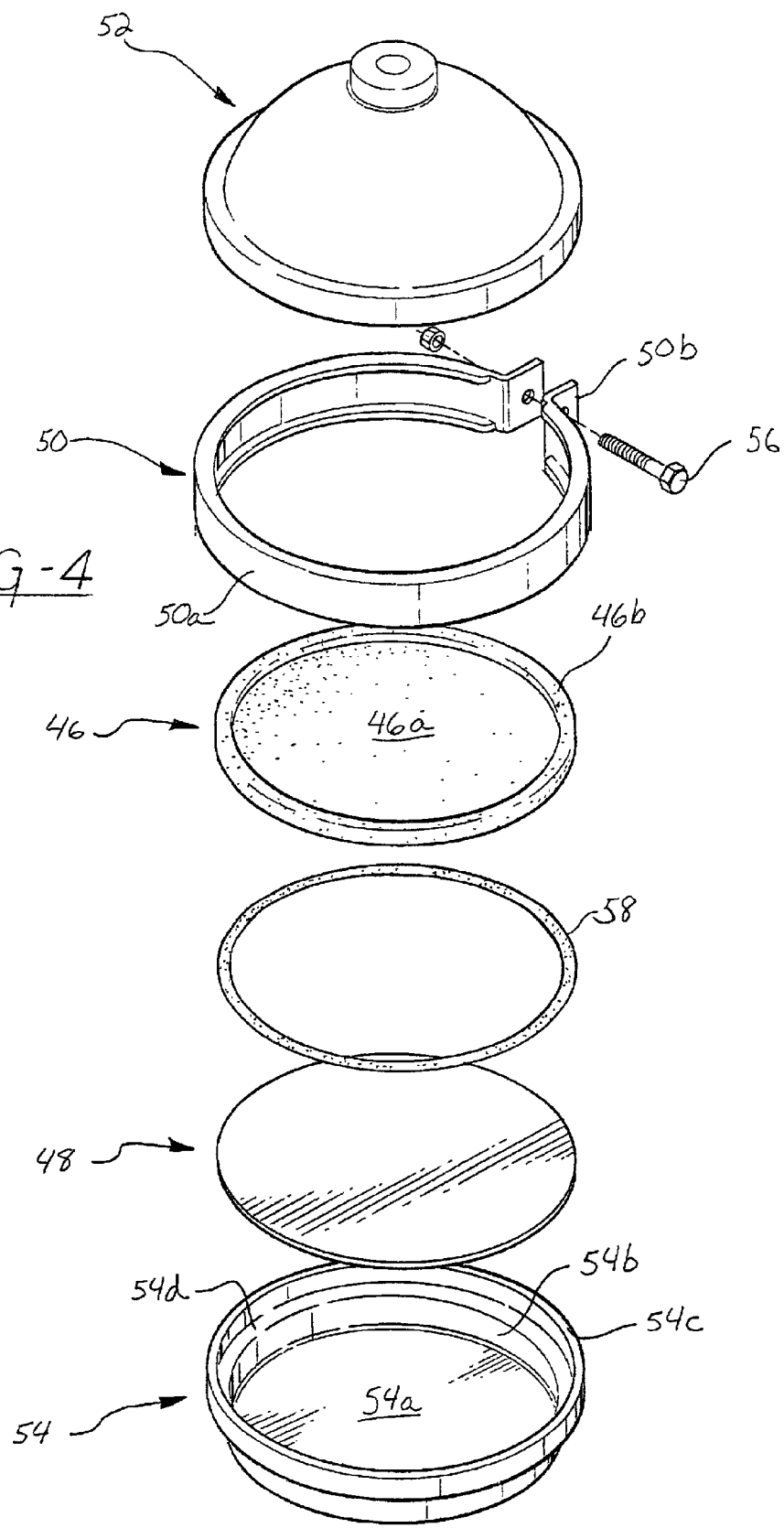

TRIPLE ACTION DAMPER FOR HYDRAULIC CLUTCH ACTUATOR

FIELD OF THE INVENTION

This application is a continuation-in-part of U.S. patent application Ser. No. 09/620,436 filed on Jul. 20, 2000 now U.S. Pat. No. 6,430,928.

BACKGROUND OF THE INVENTION

This invention relates to hydraulic clutch actuators and more particularly to hydraulic clutch actuators employing a damper mechanism.

Hydraulic actuators are known for operating a mechanism at a remote location by way of a master cylinder connected to a slave cylinder installed at the remote location. A conduit interconnects the master cylinder and the slave cylinder and the hydraulic apparatus is filled with hydraulic fluid such that, when the piston of the master cylinder is actuated, the piston of the slave cylinder and consequently the piston rod or output member is simultaneously actuated by displacement of the hydraulic fluid from the master cylinder to the slave cylinder through the conduit.

More particularly, it is known to provide such a hydraulic actuator for operating the clutch in a motor vehicle so that, when the clutch pedal of the vehicle is depressed by the driver, the slave cylinder is actuated to operate the clutch in known manner. Preferably, as described in U.S. Pat. No. 4,599,860 assigned to assignee of the present application, the clutch actuator is provided to the motor vehicle manufacturer in an assembled pre-filled form to simplify installation of the actuator on the vehicle, avoid the inconvenience of potential spillage of hydraulic fluid during on-line filling, eliminate the necessity to bleed or purge the lines of the actuator to facilitate the filling process, and eliminate the need to test the actuator after installation and filling. Whereas hydraulic clutch actuators, and particularly pre-filled clutch actuators, have enjoyed significant commercial success, they have the ability to transmit vibrations backwardly through the system from the clutch through the clutch pedal with the result that the operator may experience unpleasant vibrations at the clutch pedal.

Specifically, imbalances in the crank shaft of the vehicle engine or engine firing impulses are transmitted to the flywheel which under goes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting slave cylinder and the master cylinder, through the hydraulic fluid in the master cylinder, and then through the master cylinder push rod to the clutch pedal where they are experienced by the operator as vibrations of the clutch pedal. The propagated vibrations may also generate a pedal growl which is audible to the operator as well as a clutch roar which also may be audible to the operator.

Various devices have been proposed in an attempt to attenuate these vibrations. For example, tuned masses have been attached to various parts of the clutch system including the clutch release lever, the slave cylinder push rod, and the clutch pedal; rubber dampers have been employed in the master cylinder push rod; rubber hose sections have been employed in the conduit interconnecting the master cylinder and the slave cylinder; and various damper devices have been proposed for installation in the interconnecting conduit. In particular, a damper device as shown in British Patent Specification 1562709 or as shown in U.S. Pat. Nos. 4,998,609 or 5,320,203, all assigned to the assignee of the present invention, may be installed in the conduit interconnecting the master cylinder and the slave cylinder.

Whereas these prior art devices have been successful in varying degrees in attenuating the vibrations in the system, they are dedicated to attenuating vibrations in a predetermined frequency range and accordingly are ineffective in attenuating vibrations falling outside of the predetermined range. Specifically, damping devices that are effective in attenuating the high frequency vibrations occurring in the system during engagement and disengagement of the clutch during normal driving are generally ineffective in attenuating the low frequency vibrations appearing at the clutch pedal during engine idle conditions with the transmission in neutral.

SUMMARY OF THE INVENTION

This invention is directed to the provision of an improved damper device for use in association with a hydraulic clutch actuator.

More particularly, this invention is directed to the provision of an improved damper device for use in association with a hydraulic clutch actuator which effectively attenuates various frequency vibration ranges in the system.

This invention relates to a damper for provision in a hydraulic actuator system between a master cylinder and slave cylinder of the system. The damper includes a housing, including port means for connection in the system, and an imperforate diaphragm carried by the housing beneath the port means and forming a boundary wall of the system so that the diaphragm may deflect in response to vibrations transmitted through the hydraulic fluid in the system to effect damping of the vibrations.

According to the invention, the housing has a canister configuration and includes a thin imperforate annular sidewall above the diaphragm of substantially uniform thickness and coacting with the diaphragm to define a large volume chamber above the diaphragm providing further system damping by virtue of vibratory volumetric expansion of the annular sidewall. This arrangement allows the diaphragm to attenuate low frequency vibrations while allowing the vibratorily expanding annular sidewall to attenuate relatively high frequency vibrations.

According to a further feature of the invention, the imperforate diaphragm comprises an elastomeric diaphragm and the damper further includes a relatively stiff diaphragm positioned beneath and generally parallel to the elastomeric diaphragm to form a gas chamber therebetween and forming a back up for the elastomeric diaphragm. With this arrangement, the elastomeric diaphragm may deform against the relatively stiff diaphragm in response to intermediate frequency vibrations transmitted through the hydraulic fluid to cause deflection of the relatively stiff diaphragm and effect damping of the intermediate frequency vibrations.

According to a further feature of the invention, the volume of the hydraulic chamber substantially exceeds the volume of the gas chamber whereby to provide a large volume chamber effective to damp the high frequency vibrations in the system.

According to a further feature of the invention, the housing includes an upper part defining the annular sidewall and the port means and a lower part positioned beneath the stiff diaphragm and the upper and lower parts coact to clamp peripheral edge portions of the elastomeric diaphragm and the stiff diaphragm therebetween. This arrangement provides a convenient packaging means to provide a damper able to attenuate low frequency, intermediate frequency, and high frequency vibrations in the system.

According to a further feature of the invention, the annular sidewall is configured above the elastomeric diaphragm to have a domed configuration with the port means substantially at the apex of the dome. The domed configuration above the elastomeric diaphragm facilitates the vibratory volumetric expansion of the fluid chamber.

According to a further feature of the invention, the elastomeric diaphragm comprises a rubber diaphragm; the housing is formed of a plastics material; and the stiff diaphragm comprises a spring steel diaphragm.

Other objects and advantages and applications of the present invention will become apparent to those skilled in the art when the following description of the best modes contemplated for practicing the invention are ready in conjunction with the accompanying drawings.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a fragmentary view of the invention damper looking in the direction of the arrows 2 in FIG. 1;

FIG. 3 is a cross-sectional view taken on line 3—3 of FIG. 2; and

FIG. 4 is an exploded view of the damper.

DETAILED DESCRIPTION OF THE PREFERRED EMBODIMENT

Figure 1:
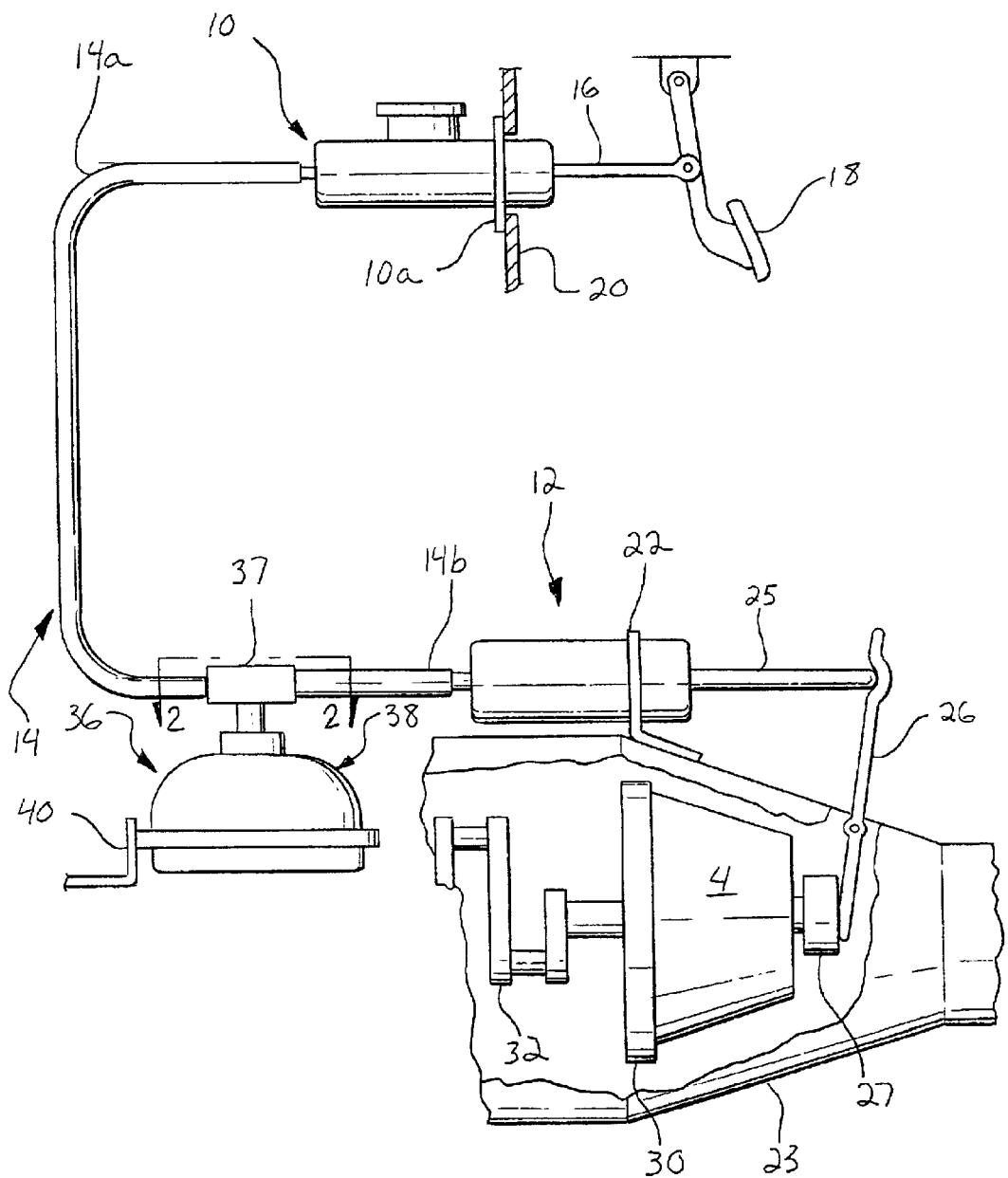
FIG. 1 is a somewhat schematic view of a hydraulic clutch actuator employing the invention damper.

The hydraulic clutch actuator shown schematically in FIG. 1 includes a master cylinder 10, a slave cylinder 12, and a conduit 14 extending between the outlet or discharge of the master cylinder and the inlet of the slave cylinder.

Master cylinder 10 includes an input rod 16 connected in known manner to the clutch pedal 18 of an associated motor vehicle so that pivotal movement of the clutch pedal by the vehicle operator moves a piston of the master cylinder in known manner to discharge pressure fluid from the cylinder. Cylinder 10 further includes a flange 10a to facilitate attachment of the master cylinder to the fire wall 20 of the vehicle.

Slave cylinder 12 is secured as by a bracket 22 to the bell housing 23 enclosing the clutch 24 of the vehicle and includes an output rod 25 coacting in known manner with a clutch release lever 26 so that pivotal movement of clutch pedal 18 by the operator results in discharge of pressure fluid from master cylinder 10 for conveyance through conduit 14 to slave cylinder 12 to provide extension of output rod 25 and pivotal movement of release lever 26 to move the clutch release bearing 27 in a direction to disengage the clutch 24. Clutch 24 is driven in known manner by a flywheel 30 which in turn is driven by an engine crank shaft 32. The invention damper assembly 36 is interposed in conduit 14 and is connected to the outlet of master cylinder 10 by a conduit portion 14a and to the inlet of slave cylinder 12 by a conduit portion 14b. Conduit portions 14a and 14b communicate with the opposite ends of a union 37.

Damper assembly 36 includes a damper 38 and a bracket 40 to facilitate attachment of damper 38 to a fixed vehicle panel.

Damper 38 includes a housing 44, a relatively flexible elastomeric diaphragm 46, a relatively stiff metallic diaphragm 48, and a clamp ring 50.

Housing 40 is formed of a molded plastic material such for example as a molded long fiber glass reinforced plastic and includes an upper part 52 and a lower part 54. Both having a generally circular configuration.

Upper part 52 defines an annular sidewall portion 52a and is configured to have a domed configuration 52b with a port 52c defined at the apex of the domed configuration. Upper part 52 further includes a lower peripheral rim portion 52d defining a downwardly opening annular groove 52e. The annular sidewall portion 52a and the domed configuration 52b have a canister configuration and are formed as an imperforate, thin wall of substantially uniform thickness.

Lower part 54 includes a planar end wall portion 54a, an annular sidewall portion 54b, and a peripheral lip portion 52c coacting with annular sidewall portion 54b to define an upwardly facing annular shoulder 54d.

Elastomeric diaphragm 46 may be formed for example of a suitable rubber material and has a generally circular, disc configuration including a circular imperforate planar main body portion 46a and a peripheral upstanding bead portion 46b. Main body portion 46a defines parallel planar upper and lower faces 46c and 46d.

Relatively stiff metallic diaphragm 48 may be formed for example of a spring steel material and has a circular imperforate disc configuration generally corresponding to the circular disc configuration of the elastomeric diaphragm. Diaphragm 48 includes planar upper and lower faces 48a and 48b.

Clamp ring 50 is of known form and may include for example a split main body circular portion 50a of U cross sectional configuration and a pair of spaced ear portions 50b for tightening coaction in known manner with a suitable tightening screw 56.

In the assembled relation of the damper 38, spring steel diaphragm 48 is positioned with its peripheral outer edge portion 48c seated on shoulder 54d of the lower housing part; an O-ring 58 is positioned on top of the spring steel diaphragm; elastomeric diaphragm 46 is positioned on top of the O-ring in stacked configuration; the peripheral rim portion 52d of the upper housing part is seated over the lip portion 54c of the lower housing part with the bead portion 46b of the elastomeric diaphragm received in the groove 52e of the upper housing part; and clamp ring 50 encircles peripheral rim portion 52d and peripheral lip portion 54c and functions to hold the parts in a tightly clamped configuration. In this tightly clamped configuration, the annular sidewall 52a of the upper part and the domed configuration 52d of the upper part will be seen to have a canister configuration and to coact with the upper face 46c of the elastomeric diaphragm to define a large volume hydraulic chamber 60 above the elastomeric diaphragm, and the lower face 46d of the elastomeric diaphragm will seen to coact with the upper face 48a of the spring steel diaphragm to define a narrow gas chamber 62 between the elastomeric diaphragm and the spring steel diaphragm. It will be seen that the volume of hydraulic chamber 60 substantially exceeds the volume of gas chamber 62 and it will be further seen that the annular sidewall 52a of the upper housing part extends above the upper face of the elastomeric diaphragm a distance substantially exceeding the height of the gas chamber 62.

When incorporated in the hydraulic clutch actuator system of FIG. 1, a branch 37a of the union 37 is positioned in port 52c so that system hydraulic fluid fills the chamber 60 and the upper face 46c of the elastomeric diaphragm forms a boundary wall of the clutch actuator system so that pulsations experienced in the fluid positioned in the conduit portions 14a, 14b are experienced at the upper face of the elastomeric diaphragm.

In operation, low frequency vibrations (for example 0–50 hertz) transmitted through the hydraulic fluid in the system to the damper have the effect of deflecting the elastomeric diaphragm 46 to effect damping of the low frequency vibrations. This damping action of the elastomeric diaphragm with respect to the low frequency vibrations has no effect on the spring steel diaphragm 48. However, in response to intermediate frequency vibrations (for example between 50–150 hertz) transmitted through the hydraulic fluid to the damper, the spring steel diaphragm forms a back up for the elastomeric diaphragm and, specifically, the elastomeric diaphragm 46 elastically deforms against the spring steel diaphragm 48 to seat the lower face 46d of the elastomeric diaphragm against the upper face 46a of the spring steel diaphragm to cause deflection of the spring steel diaphragm whereby to effect damping of the intermediate frequency vibrations. In this mode, the elastomeric diaphragm is no longer serving a damping function but is simply transmitting impulses to the spring steel diaphragm against which it is seated to allow the spring steel diaphragm to damp the intermediate frequency vibrations. In response to high frequency vibrations (for example 150 hertz and up) transmitted through the hydraulic fluid to the damper, the thin annular and domed sidewalls of the upper housing part undergo vibratory expansion to attenuate these high frequency vibrations. It will be seen that the thin annular and domed sidewalls act as a canister to allow vibratory expansion of the large volume hydraulic chamber 60 above the elastomeric diaphragm whereby to damp the high frequency vibrations in the system.

In overview, therefore, the elastomeric diaphragm acts to attenuate low frequency vibrations; the spring steel diaphragm acts to attenuate intermediate frequency vibrations; and the thin canister sidewalls of the upper housing part act to attenuate high frequency vibrations.

The invention damper is thus effective to dampen the low frequency vibrations typically appearing at the clutch pedal during engine idle conditions with the transmission in neutral as well as the intermediate and high frequency vibrations appearing in the system during engagement and disengagement of the clutch during normal driving. That is, the damper of invention has the multiple effect of damping not only the low frequency vibrations encountered at idle in the system, but also the intermediate and high frequency vibrations encountered during normal driving conditions.

Whereas the system may be designed, as indicated, so that the elastomeric diaphragm attenuates vibrations up to 50 hertz, the spring steel diaphragm attenuates vibrations between 50–150 hertz, and the upper canister housing part attenuates vibrations in excess of 150 hertz, it will be understood that the actual frequency ranges attenuated by each stage of the damper will depend upon various parameters of the damper and the damper may be readily tuned to vary the frequency ranges that are handled by each stage of the damper. It will further be understood that in practice there will be some overlap between the frequency ranges handled by each stage of the damper.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hydraulic clutch actuator system including a master cylinder, a slave cylinder, and a damper between the master cylinder and the slave cylinder, the damper including a housing, including port means for connecting in the system and an imperforate diaphragm carried by the housing beneath the port means and forming a boundary for the system so that the diaphragm may deflect in response to vibrations transmitted through the hydraulic fluid in the system to effect damping of the vibrations, characterized in that:

the housing has a canister configuration and includes a thin imperforate annular sidewall above the diaphragm of substantially uniform thickness and coacting with the diaphragm to define a large volume fluid chamber above the diaphragm providing further system damping by virtue of vibratory volumetric expansion of the annular sidewall.

2. A damper according to claim 1 wherein:

the housing includes an upper part defining the annular sidewall and the port means and a lower part positioned beneath the diaphragm; and the upper and lower parts coact to clamp a peripheral edge portion of the diaphragm therebetween.

3. A damper according to claim 2 wherein the annular sidewall is configured above the elastomeric diaphragm to have a domed configuration with the port means substantially at the apex of the dome.

4. A damper for provision in a hydraulic actuator system between a master cylinder and a slave cylinder of the system, the damper including a housing, including port means for connecting in the system and an imperforate diaphragm carried by the housing beneath the port means and forming a boundary for the system so that the diaphragm may deflect in response to vibrations transmitted through the hydraulic fluid in the system to effect damping of the vibrations: characterized in that:

the housing has a canister configuration and includes a thin imperforate annular sidewall above the diaphragm of substantially uniform thickness and coacting with the diaphragm to define a large volume fluid chamber above the diaphrapm providing further system damping by virtue of vibratory volumetric expansion of the annular sidewall;

the diaphragm comprises an elastomeric diaphragm; and the damper further includes a stiff diaphragm carried by the housing beneath the elastomeric diaphragm and forming a back up for the elastomeric diaphragm.

5. A damper according to claim 4 wherein:

the housing includes an upper part defining the annular sidewall and the port means and a lower part positioned beneath the stiff diaphragm; and the upper and lower parts coact to clamp peripheral edge portions of the elastomeric diaphragm and the stiff diaphragm therebetween.

6. A damper for provision in a hydraulic actuator system between the master cylinder and a slave cylinder of the system, the damper including a housing, including port means for connecting in the system and an elastomeric diaphragm carried by the housing beneath the port means and forming a boundary wall of the system so that the elastomeric diaphragm may deflect in response to low frequency vibrations transmitted through the hydraulic fluid in the system to effect damping of the low frequency vibrations and a further diaphragm positioned beneath and generally parallel to the elastomeric diaphragm to form a gas chamber therebetween and forming a back up for the elastomeric diaphragm so that the elastomeric diaphragm may deform against the further diaphragm in response to high frequency vibrations transmitted through the hydraulic fluid to cause deflection of the further diaphragm to effect damping of the high frequency vibrations, characterized in that:

the housing has a canister configuration and includes a thin imperforate annular sidewall above the elastomeric sidewall of substantially uniform thickness and coacting with the elastomeric diaphragm to define a large volume hydraulic chamber above the elastomeric diaphragm providing further system damping by virtue of vibratory volumetric expansion of the annular sidewall.

7. A damper according to claim 6 wherein the volume of the hydraulic chamber substantially exceeds the volume of the gas chamber.

8. A damper according to claim 6 wherein the annular sidewall forming the hydraulic chamber extends above the elastomeric diaphragm a distance substantially exceeding the height of the gas chamber.

9. A damper according to claim 6 wherein:

the further diaphragm comprises a spring steel diaphragm;

the housing is formed of a plastics material; and the elastomeric diaphragm comprises a rubber diaphragm.

10. A damper according to claim 6 wherein the housing comprises a two part housing including an upper part defining the annular sidewall and coacting with the elastomeric diaphragm to define the hydraulic chamber and the ports means and a lower part underlining the further diaphragm.

11. A damper according to claim 10 wherein the upper and lower parts define peripheral edge portions which coact to clamp peripheral edge portions of the elastomeric diaphragm and the further diaphragm therebetween.

12. A damper according to claim 11 wherein the peripheral edge portions of the upper and lower parts are held together in clamped relation by an annular clamp band surrounding the peripheral edge portions of the upper and lower parts.

* * * * *